US008936724B2

(12) United States Patent
Hunt

(10) Patent No.: US 8,936,724 B2
(45) Date of Patent: *Jan. 20, 2015

(54) FILTRATION CARTRIDGE FORMED OF STACKED PLATES

(75) Inventor: Stephen G. Hunt, North Billerica, MA (US)

(73) Assignee: EMD Millipore Corporation, Billerica, MA (US)

( * ) Notice: Subject to any disclaimer, the term of this patent is extended or adjusted under 35 U.S.C. 154(b) by 783 days.

This patent is subject to a terminal disclaimer.

(21) Appl. No.: 12/733,958

(22) PCT Filed: Sep. 11, 2008

(86) PCT No.: PCT/US2008/010616
§ 371 (c)(1),
(2), (4) Date: Jul. 14, 2010

(87) PCT Pub. No.: WO2009/045264
PCT Pub. Date: Apr. 9, 2009

(65) Prior Publication Data
US 2010/0282663 A1     Nov. 11, 2010

Related U.S. Application Data

(60) Provisional application No. 60/997,420, filed on Oct. 3, 2007.

(51) Int. Cl.
*B01D 63/08* (2006.01)
*B01D 65/00* (2006.01)
*B01D 65/10* (2006.01)

(52) U.S. Cl.
CPC ............ *B01D 63/082* (2013.01); *B01D 65/003* (2013.01); *B01D 65/102* (2013.01);

(Continued)

(58) Field of Classification Search
USPC ............. 210/321.64, 321.72, 321.75, 321.84, 210/224, 228, 229, 231, 232, 238, 323.1, 210/455, 456, 488, 492; 422/534, 535
See application file for complete search history.

(56) References Cited

U.S. PATENT DOCUMENTS 4,310,416 A * 1/1982 Tanaka et al. ............ 210/321.75
4,430,218 A * 2/1984 Perl et al. ................. 210/321.75

(Continued)

FOREIGN PATENT DOCUMENTS

DE      4342485 C1     3/1995
DE     19860253 C1     3/2000

(Continued)

OTHER PUBLICATIONS

Phillips, et al., "A Validatible Porosimetric Technique for Verifying the Integrity of Virus-Retentive Membranes", Biologicals, vol. 24, No. 3, Sep. 1996, pp. 243-253.

(Continued)

*Primary Examiner* — David C Mellon
*Assistant Examiner* — Pranav Patel
(74) *Attorney, Agent, or Firm* — EMD Millipore Corporation

(57) ABSTRACT

A filtration cartridge is provided comprising one or a stack of filtration units sealed to each other at their outer periphery and to end caps thereby eliminating the need for a housing surrounding the stack. Fluid pathways are provided so that filtration of all incoming feed is assured prior to passing from the cartridge as filtrate. Two permeate pathways are provided to direct permeate to an outlet from the filtration cartridge.

2 Claims, 6 Drawing Sheets

(52) U.S. Cl.
CPC ......... *B01D 2313/14* (2013.01); *B01D 2313/16* (2013.01); *B01D 2315/08* (2013.01); *B01D 2315/10* (2013.01)
USPC .. 210/321.75; 210/472; 210/498; 210/321.84

(56) References Cited

U.S. PATENT DOCUMENTS

| | | | |
|---|---|---|---|
| 4,501,663 A | | 2/1985 | Merrill |
| 4,624,784 A | * | 11/1986 | Lefebvre ................ 210/321.67 |
| 4,701,861 A | | 10/1987 | Kauke |
| 4,881,176 A | | 11/1989 | Kononov |
| 4,940,562 A | | 7/1990 | Watanabe et al. |
| 5,282,380 A | | 2/1994 | DiLeo et al. |
| 5,457,986 A | | 10/1995 | DiLeo et al. |
| 5,575,910 A | * | 11/1996 | Karbachsch et al. .... 210/321.75 |
| 5,581,017 A | | 12/1996 | Bejtlich, III |
| 6,067,844 A | | 5/2000 | Westbrook et al. |
| 6,568,282 B1 | | 5/2003 | Ganzi |
| 6,907,770 B2 | | 6/2005 | Von Der Hardt et al. |
| 6,983,505 B2 | | 1/2006 | McIntosh et al. |
| 2006/0273008 A1 | * | 12/2006 | Phillips ........................ 210/644 |
| 2007/0079649 A1 | | 4/2007 | Nauseda et al. |
| 2007/0125497 A1 | | 6/2007 | Lundell et al. |
| 2008/0257814 A1 | * | 10/2008 | Vigna et al. .............. 210/321.84 |

FOREIGN PATENT DOCUMENTS

| | | | |
|---|---|---|---|
| DE | 19923155 A1 | 11/2000 | |
| EP | 0267108 A1 | 5/1988 | |
| EP | 0640822 A2 | 3/1995 | |
| EP | 0658372 A2 | 6/1995 | |
| EP | 0879635 A1 | 11/1998 | |
| EP | 1987869 A1 | 11/2008 | |
| GB | 2233579 A | 1/1991 | |
| JP | 60155818 A | 8/1985 | |
| JP | 62-66594 A | 3/1987 | |
| JP | 62062815 A | 3/1987 | |
| JP | 62-62815 U | 4/1987 | |
| JP | 63-173308 U | 11/1988 | |
| JP | 2001-507986 A | 6/2001 | |
| JP | 2007-125497 A | 5/2007 | |
| WO | 98/30308 A1 | 7/1998 | |
| WO | 02/076592 A1 | 10/2002 | |
| WO | 2006/044711 A1 | 4/2006 | |

OTHER PUBLICATIONS

Meltzer, et al., "Filtration in the Biopharmaceutical Industry", Marcel Dekkar, Inc., New York, 1998, 67 pages.

Extended European Search Report received for EP patent Application No. 06122090.1 mailed on May 3, 2007, 3 pages.

International Search Report and Written Opinion received for PCT patent Application No. PCT/US2008/010616, mailed on Aug. 6, 2010, 14 pages.

International Preliminary Report on Patentability received for PCT Patent Application No. PCT/US2008/010616, issued on Aug. 31, 2010, 10 pages.

Partial European Search Report received for EP patent Application No. 10161691.0 mailed on Jun. 29, 2011, 3 pages.

Prudhomme, et al., "Laminar Compressible Flow in a Tube", Appl. Sci. Res., vol. 43, No. 6, 1986, pp. 67-74.

Extended European Search Report received for European Patent Application No. 10161691.0, mailed on Nov. 17, 2011, 9 pages.

* cited by examiner

LID

SID

LID

FILTRATION CARTRIDGE FORMED OF STACKED PLATES

CROSS REFERENCE TO RELATED APPLICATIONS

This application is the U.S. National Stage Application of International Application No.: PCT/US2008/010616, filed on Sep. 11, 2008, which claims priority to U.S. Application No. 60/997,420, filed Oct. 3, 2007.

FIELD OF THE INVENTION

This invention relates to a filtration cartridge free of a separate exterior housing. More particularly, this invention relates to such a filtration cartridge having two permeate pathways to a permeate outlet from the filtration cartridge.

BACKGROUND OF THE INVENTION

Membrane filters of various polymeric materials are known and are generally thin porous structures having porosities between about 50-80% by volume. They are relatively fragile and are commonly used with various types of mechanical support or reinforcement. Flow rates of liquids through such membranes per unit of area are a function of pore size. To obtain high flow rates through filters with fine pores, for example below about one micron, relatively large filter areas are needed. Such areas have therefore been provided by using large individual filters or by using a number of smaller individual filters in parallel. For use in critical pharmaceutical applications such as sterilization, such membranes and their supporting apparatus must be free of leaks or defects capable of passing small particles or organisms.

Numbers of small filters have theretofore been hand-assembled for parallel flow with supporting plates and associated apparatus, then tested, and, if necessary, sterilized, often at the user's site at considerable cost and inconvenience. The operations must be repeated if the hand assembly fails the necessary tests. The mechanical parts of larger more complex filtration systems are generally cleaned and re-used with only the filters being replaced. One assembly heretofore provided in disposable plastic has also been mechanically secured with relatively moveable parts.

Individual membrane filters of large area have been supported flat or cylindrically, or have been pleated for disposition in compact housings. Holders for flat membranes are large, for a given filter area, are usually not disposable, and also require disassembly, cleaning, reassembly and testing with each change of filter. Pleating of fragile membranes creates stress concentrations at the folds, permits flexing of the fragile membranes in use, normally requires interleaving flow screens on one or both of the upstream and downstream sides and requires potting and/or adhesives to seal the ends and overlapping seams. Because of concerns for possible failures at the folds, seams, or ends, a separate flat final filter is sometimes used in series with pleated cartridges for added assurance in critical applications, for example, in sterilizing pharmaceuticals and intravenous fluids. In addition, the use of a number of different materials in pleated cartridge construction increases the sources for extractibles into the filtrate.

The fluid processed in presently available filter cartridges experiences pressure drop which limits the volume of fluid that can be processed through the cartridge. The degree of pressure drop is closely related to the flow path length of the fluid within the cartridge. The longer the flow path length, the greater the pressure drop.

U.S. Pat. No. 4,501,663 discloses a filtration cartridge formed from a plurality of stacked filtration modules and having a separate exterior housing. The cartridge is undesirable since it has a large hold up volume which results in sample loss.

U.S. patent application Ser. No. 60/925,774, filed Apr. 23, 2007 discloses a filtration cartridge having a feed inlet and a permeate outlet positioned at a central portion of the cartridge. This cartridge requires a fluid deflection plate to direct incoming fluid feed from a central portion of the cartridge to a peripheral portion of the cartridge. The inclusion of a deflection plate is undesirable since it adds a nonworking element to the cartridge.

At the present time an integrity test utilizes a binary gas for determining the presence of defects in membranes in a filtration cartridge. The test provides greater accuracy when the binary gas is flowed in a tangential flow filtration mode (TFF) rather than a normal flow filtration mode (NFF) (dead ended filtration). This integrity test is described in U.S. patent application Ser. No. 11/545,738, filed Oct. 10, 2006 which is incorporated herein by reference. Accordingly, when it is desired to effect NFF filtration within a filtration cartridge and to effect the integrity test, the filtration cartridge must be capable of being operated in both TFF and NFF modes.

Accordingly, it would be desirable to provide a filtration cartridge having a single feed inlet and a single permeate outlet for reasons of simplicity. In addition, it would be desirable to provide such a cartridge which can be operated in both TFF and NFF modes. Furthermore, it would be desirable to provide a filtration cartridge with a minimum of nonworking elements to reduce cost. In addition, it would be desirable to provide such a cartridge wherein the fluid being processed experiences a low pressure drop within the cartridge as compared to presently available cartridges.

SUMMARY OF THE INVENTION

The present invention provides a filtration cartridge formed from one or a plurality of filtration units which are stacked and bonded to each other to assure fluid flow from an inlet to the filtration cartridge, through at least one membrane and through an outlet from the filtration cartridge. The cartridge is capable of being operated in both TFF and NFF modes. The filtration mode is dead ended, normal flow filtration (NFF). Each filtration unit comprises two membrane support plates sealed together at their outer peripheries to form a stack of filtration units. Each membrane support plate has a first surface and a second surface. A filtration membrane, such as a single membrane or a plurality of membranes is bonded to each of the first and second surfaces of each membrane support plate. The filtration cartridge is provided with end caps, a fluid inlet, a permeate outlet and a second outlet that functions as a vent. The end caps seal the cartridge and direct flow from the feed inlet, through the membranes and out the outlet. Permeate fluid flows through two fluid pathways within the filtration cartridge so that, on average, the flow path length is one half the flow path length of a filtration cartridge having one flow path and having the same horizontal cross-section. By providing the two fluid flow paths for the permeate, pressure drop of the fluid within the cartridge is substantially reduced.

DESCRIPTION OF SPECIFIC EMBODIMENTS

Figure 1:
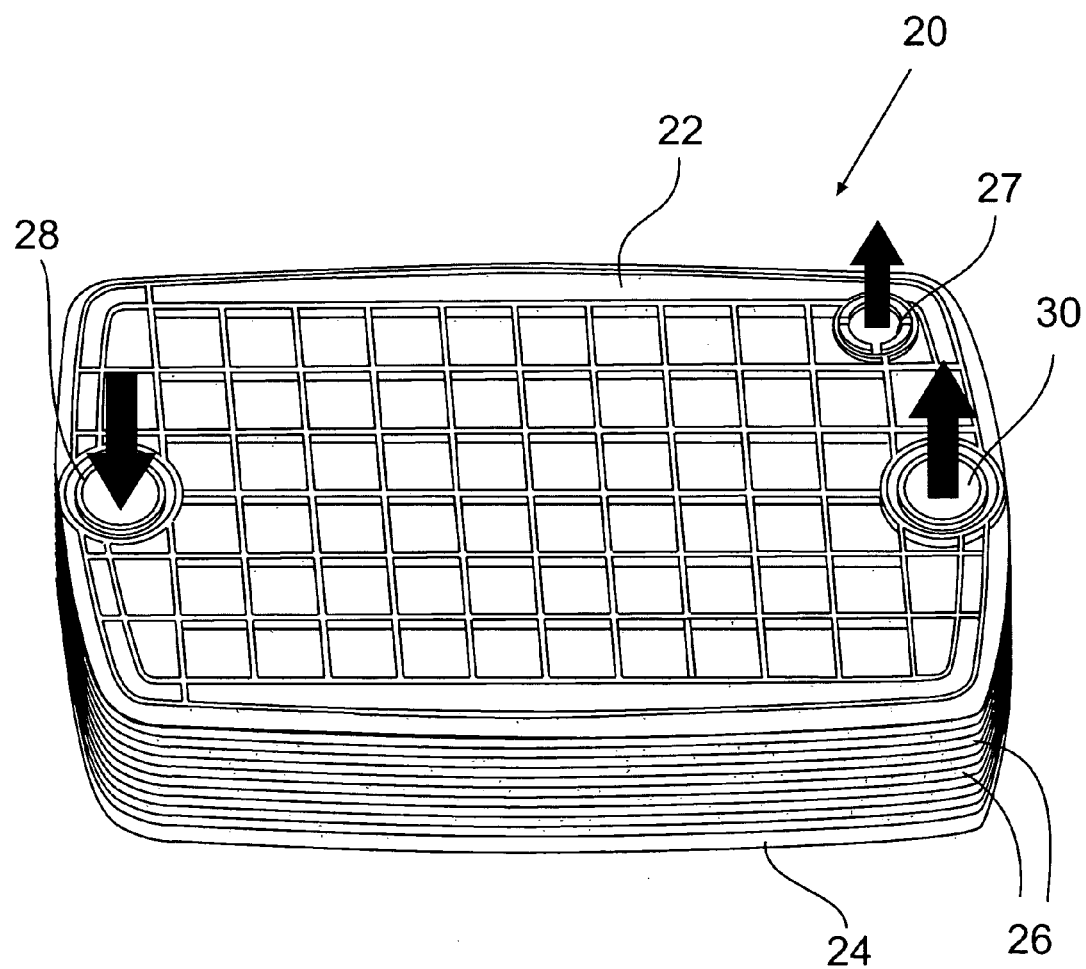
FIG. 1 is a perspective view of the filtration cartridge of this invention.

Referring to FIG. 1, a self contained filtration cartridge 20 having, for example, 0.5 square meters of filter area, is shown. The cartridge 20 comprises an upper end cap 22, a lower end cap 24, and a plurality of filtration units 26. Upper end cap 22 is provided with an inlet 28 for feed, an outlet 30 for permeate and a vent 27 to vent gas. Preferably the end caps 22 and 24 and the filtration units 26 are of the same plastic material and are selectively welded together such as with heat or solvent at their outer peripheries. The inlet 28, outlet 30 and vent 27 are respectively adapted for connection to a conduit of tubing or the like.

The vent 27 of any suitable type extends through the end cap 22 to permit the venting of air from the filtration cartridge at start-up and to permit venting of a gas to test for membrane defects when operating the filtration cartridge iii20 in TFF mode. This may comprise, for example, a manually opening valve which is opened to exhaust gas and thereafter closed.

In use, a liquid to be filtered enters inlet fitting 28, passes into the stack of filtration units 26, passes through the filtration membranes within the stack of filtration units 26, as hereinafter described, from which the permeate passes out outlet fitting 30.

Figure 2:
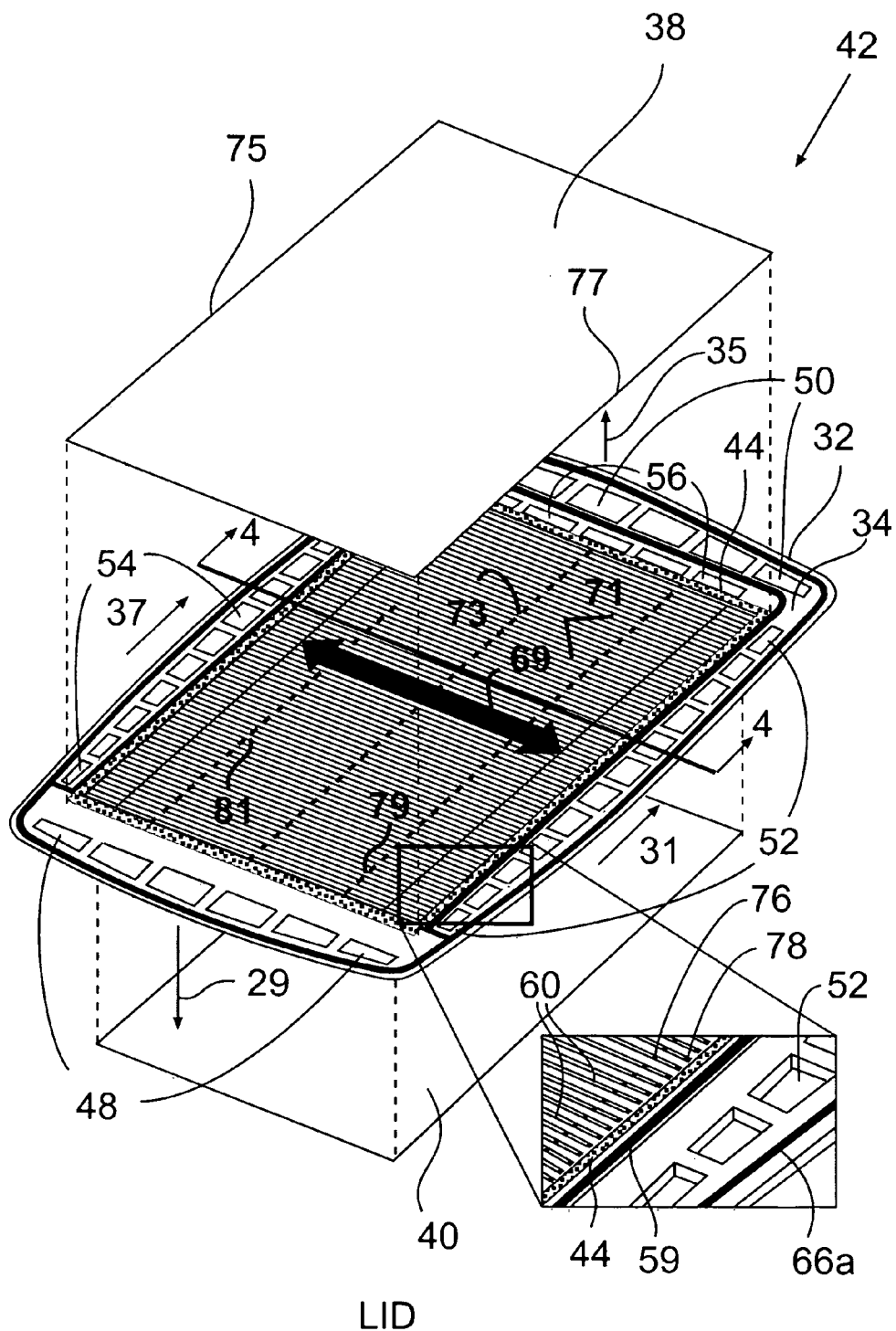
FIG. 2 is an exploded top view of a first surface of a membrane support plate of this invention.
Figure 3:
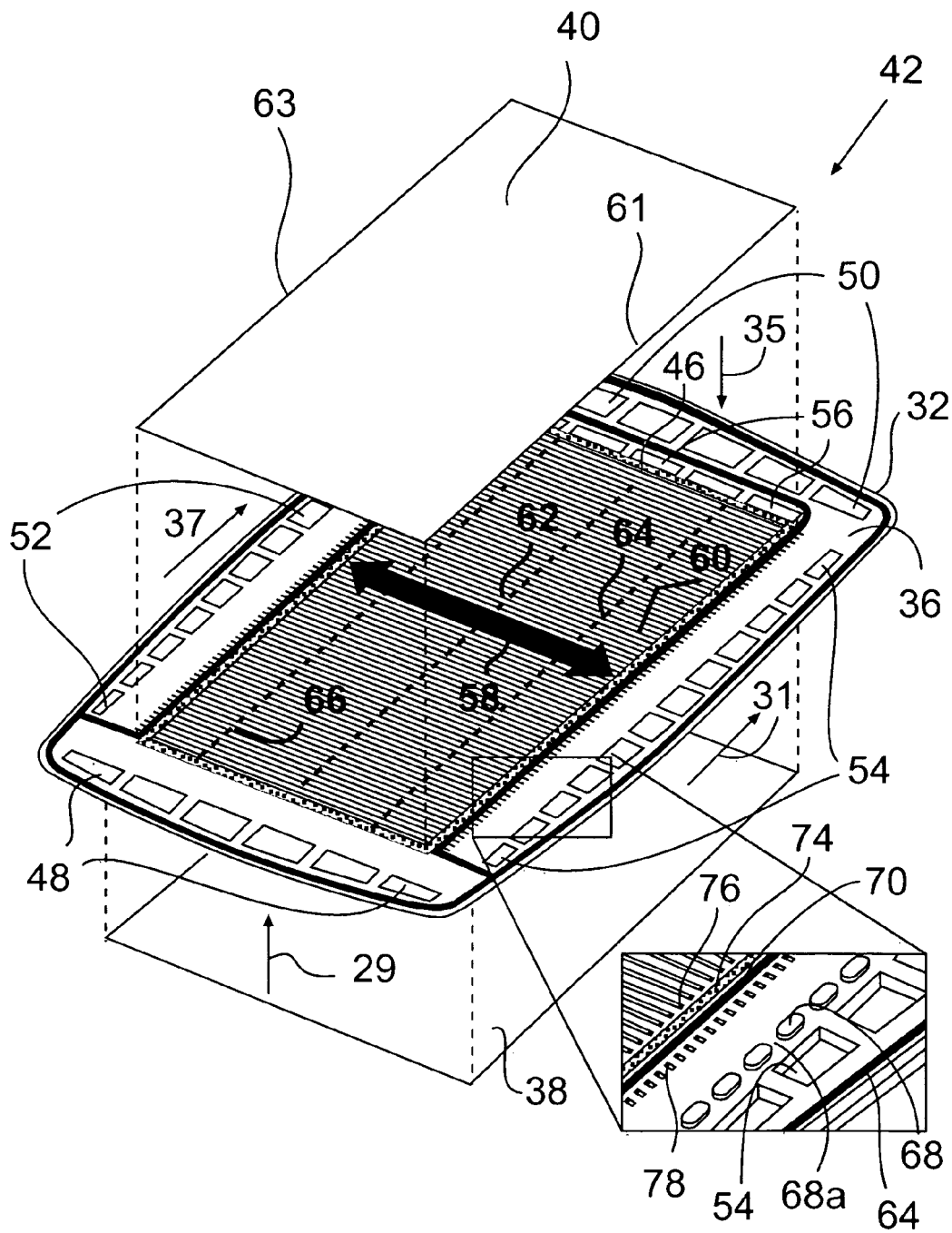
FIG. 3 is an exploded bottom view of the membrane support plate of FIG. 2.

Referring to FIGS. 2, and 3, a membrane support plate 32 has a top surface 34 (FIG. 2) and a bottom surface 36 (FIG. 3). The top surface 34 has a relatively large inner dimension (LID) to accommodate a larger membrane 38 which is larger than the membrane 40. The bottom surface 36 has a relatively smaller inner dimension (SID) to accommodate the smaller membrane 40. The filtration plate 42 shown in FIGS. 2 and 3 comprises the membrane support plate 32 and the two membranes 38 and 40 which are sealed to the entire periphery of the membrane support plate 32 at membrane seal sites 44 and 46. A filtration unit 26 capable of effecting fluid filtration is formed by joining (sealing) two filtration plates 42 to each other at the SID to SID surfaces. A stack of filtration units 26 is formed by joining (sealing) filtration units 26 to each other at the LID to LID surfaces. By sealing the SID to SID surfaces and LID to LID surfaces in this manner, a stack of filtration units 26 (FIG. 1) is formed which is capable of effecting fluid flow there through which assures that all incoming fluid feed is passed through a membrane 38 or 40 prior to exiting the outlet 30 of the filtration cartridge 20 (FIG. 1) formed from the stack of filtration units 26.

Figure 6:
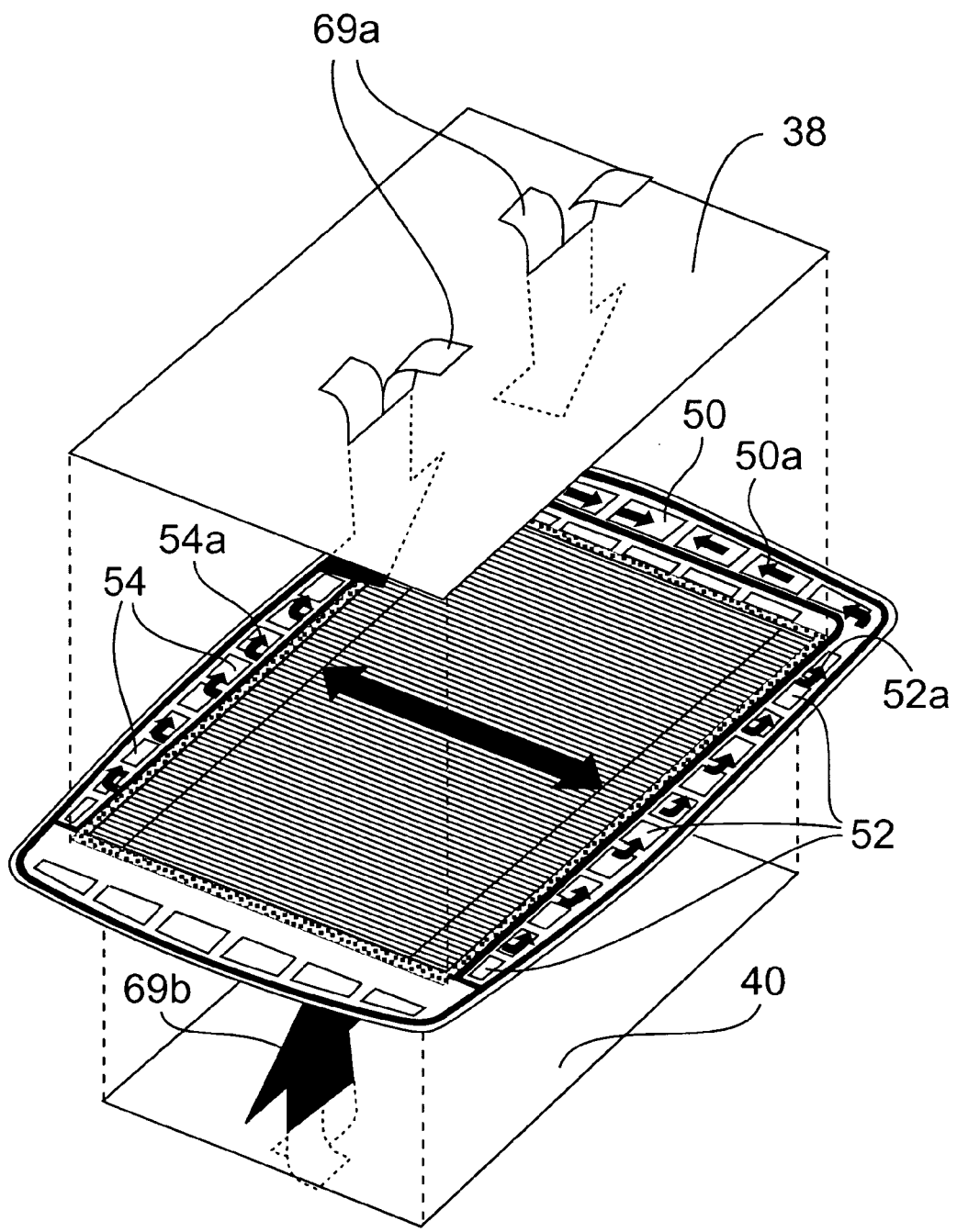
FIG. 6 is an exploded view showing the first surface of the membrane support plate of FIG. 2 and showing permeate flow paths within the filtration cartridge.

The filtration plate 42 of FIGS. 2 and 3 includes feed inlet holes 48, permeate outlet 50, two sets of permeate pathway holes 52 and 54 and vent holes 56. The two permeate pathways 52 and 54, each are in fluid communication with permeate outlet holes 50 and outlet 30 (FIG. 1). In use, feed to the filtration cartridge 20 enters through inlet 28 (FIG. 1) and passes through feed inlet holes 48 as represented in arrow 29. On the SID side (Fig. 3), fluid feed passes through membrane 40 to produce a permeate which travels in one of two directions as represented by arrow 58 through grooves 60. The furthest the permeate travels on plate 32 is from dotted line 62, which is the midpoint of the length of the grooves 60, to either edge 61 or 63 of membrane 40. The permeate, on average, travels from either dotted line 64 or dotted line 66 which are 25% of the length of grooves 60 to either edge 61 or 63 of membrane 40. The permeate travels through the spaces 68a positioned between posts 68 and then through permeate pathway holes 52 or 54 as represented by arrows 31 or 37 and out permeate holes 50 as represented by arrow 35 to the outlet 30 (FIG. 1). On the LID side (FIG. 2), fluid feed passes through membrane 38 to produce a permeate which travels in one of two directions as represented by arrow 69 through grooves 71. The furthest the permeate travels on plate 32 is from dotted line 73, which is the midpoint of the length of the grooves 73, to either edge 75 or 77 of membrane 38. The permeate, on average, travels from either dotted line 79 or dotted line 81 which are 25% of the length of grooves 71 to either edge 75 or 77 of membrane 38. The permeate travels through permeate pathway holes 52 or 54 as represented by arrows 31 or 37 and out permeate holes 50 as represented by arrow 35. As shown in FIG. 6, fluid feeds 69a and 69b pass through membranes 38 and 40. The resultant permeate travels along the pathways shown by the arrows 52a and 54a to holes 50 as shown by arrows 50a and then to outlet 30 (FIG. 1).

Figure 4:
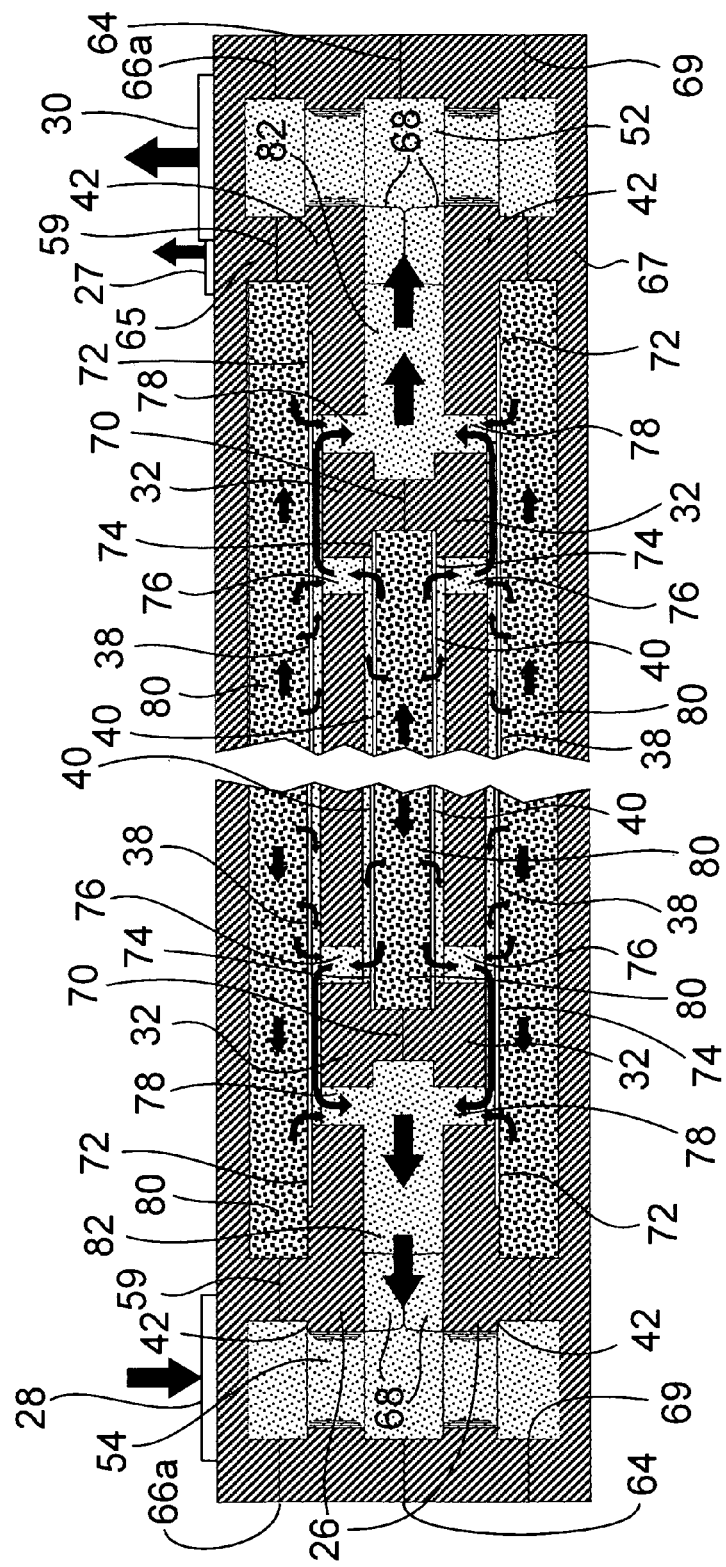
FIG. 4 is a cross sectional view of a filtration cartridge of this invention having one filtration unit.

Referring to FIG. 4, a filtration unit 26 sealed to end caps 65 and 67 is shown. The filtration unit 26 comprises two filtration plates 42 shown in FIGS. 2 and 3 and are shown at the cross section 4-4 of FIG. 2. The membrane support plates 32 are sealed together at plate seals 64, 68 and 70. Membranes 38 are sealed to the membrane plates 32 at membrane seal area 72. Membranes 40 are sealed to membrane support plates 32 at membrane seal areas 74. Membrane support plates 32 are provided with an inner row of holes 76 and an outer row of holes 78. As shown by the black arrows in FIG. 4, all incoming feed fluid 80 must pass through membranes 38 or 40 and permeate pathway holes 52 or 54 prior to being recovered as permeate 82. The filtration units 26 are sealed at their outer periphery at outer plate seal 64 and at an inner periphery at plate seal 70 (FIG. 3) on the SID side and at the outer plate seal 66a and inner plate seal on the LID side (FIG. 2). The seals 70, 64, 59 and 66a are raised from the surfaces surrounding holes 52 and 54 (FIGS. 2 and 3) so as to provide flow paths from the holes 52 and 54 to holes 50. A filtration unit 26 is sealed to end cap 65 at peripheral plate seal 66. A filtration unit 26 is sealed to end cap 65 at peripheral plate seal 69. An inlet (not shown) is provided for introducing feed into the filtration units 26. A vent 27 and an outlet 30 also are provided in the manner shown in FIG. 1. The seals 64, 66a and 69 eliminate the need for an additional outer housing to effect desired fluid flow.

Figure 5:
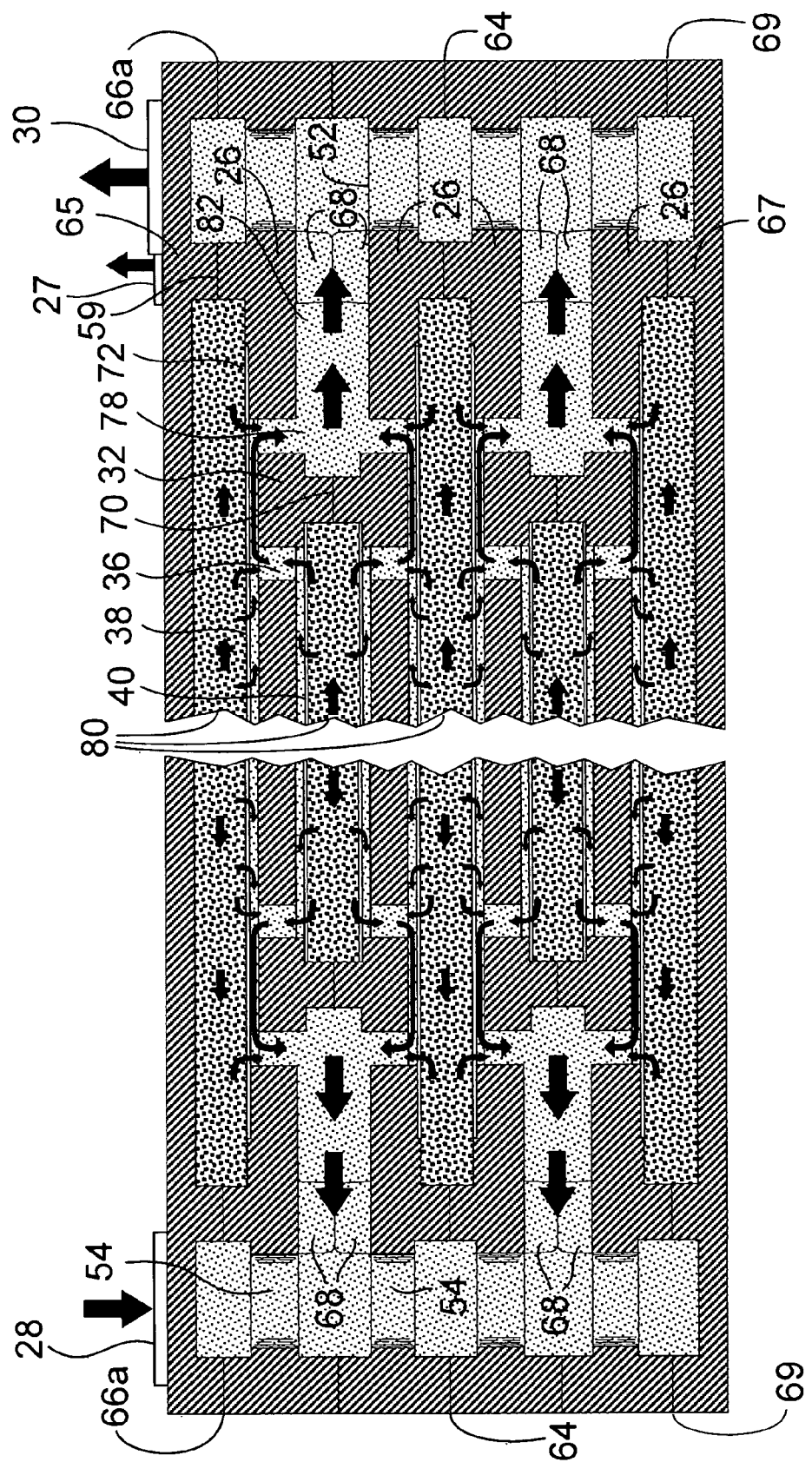
FIG. 5 is a cross-sectional view of a filtration cartridge of this invention having two filtration units.

Referring to FIG. 5, two filtration units 26, sealed together are shown. In FIG. 5, the reference numbers which are the same reference numbers in FIG. 4 identify the same elements as in FIG. 4. FIG. 5 shows that a plurality of filtration units 26 be stacked and sealed together to form a filtration cartridge 20 (FIG. 1) having two permeate paths 52 and 54 and being free of an additional outside housing.

In use, the integrity of the membranes 38 and 40 are tested with a gas such as a binary gas when operating in a TFF mode with vent 27 open. The gas passes from inlet 28, across the membrane 38 to vent 27.

In subsequent operation, the vent 27 is initially open and fluid feed is introduced through inlet 28 to produce permeate that replaces gas within the filtration cartridge 20. The vent 27 is then closed so that the vent holes 56 (FIGS. 2 and 3) are filled with permeate. Excess permeate is removed through outlet 30 over the time filtration is effected. After filtration is effected, permeate can more easily be drained from the filtration cartridge 20 through outlet 30 by opening vent 27.

The invention claimed is:

1. A self-contained filtration cartridge stack free of a separate exterior housing comprising,
a pluralty of filtration cartridges, each filtration cartridge having,
a first endcap having a fluid feed inlet, a fluid permeate outlet and a vent for venting gas,
a second endcap;
a plurality of filtration units stacked between the first and second endcaps, wherein the filtration units are in fluid communication with the first and second endcaps, and each filtration unit includes a plurality of filtration plates, each filtration plate having a membrane support plate, each membrane support plate having a top surface having a first filtration membrane bonded thereto, and a bottom surface having a second filtration membrane bonded thereto, one of the top or bottom surfaces having a relatively larger inner dimension (LID) than the other one which has a relatively smaller inner dimension (SID),
wherein each filtration unit is formed by bonding adjacent filtration plates to each other at adjacent first filtration membranes by a seal located along the outer periphery between the bonded first filtration membranes, thereby preventing fluid feed from entering the fluid outlet except by having passed through at least one of the first or second filtration membranes,
wherein the self-contained filtration cartridge stack includes each adjacent filtration cartridge stacked one on top of the other,
wherein each adjacent filtration cartridge is bonded to each other at adjacent membrane supports plates by a seal formed along the outer periphery between adjacent second filtration membranes,
wherein the self-contained filtration cartridge stack eliminates the need for an outer housing to effect desired fluid flow, thereby providing a single fluid pathway by preventing fluid feed from entering the fluid permeate outlet except by having passed through at least one of the first or second filtration membranes.

2. The filtration cartridge stack of claim 1, wherein the first filtration membrane includes a plurality of first filtration membranes bonded to the top surface of the membrane support plate, and the second filtration membrane includes a plurality of second filtration membranes bonded to the bottom surface of the membrane support plate.

* * * * *